R. D. CHEEK.
WHEAT SEPARATOR.
APPLICATION FILED JAN. 11, 1913.
1,172,110.
Patented Feb. 15, 1916.
2 SHEETS—SHEET 2.
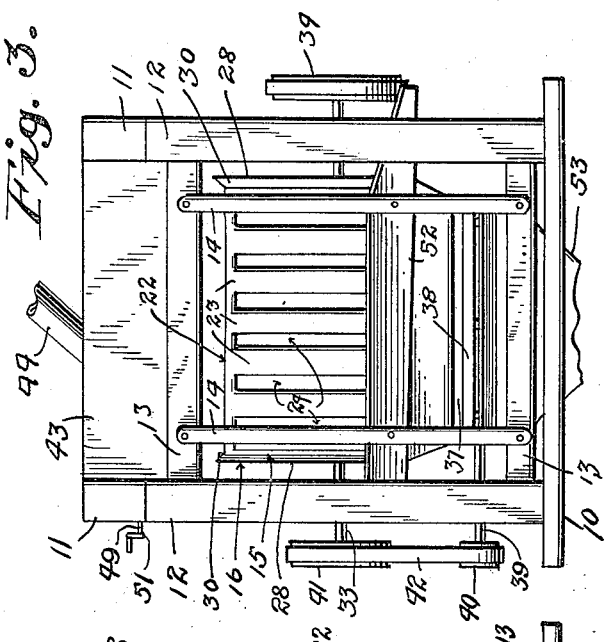
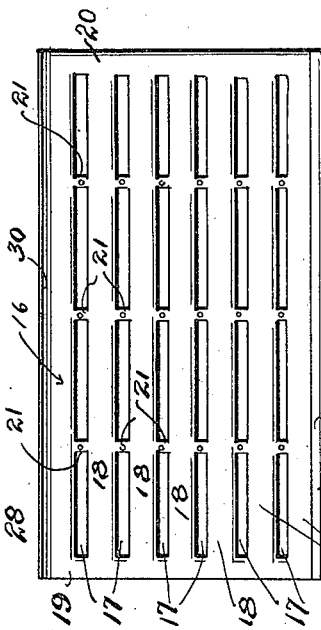
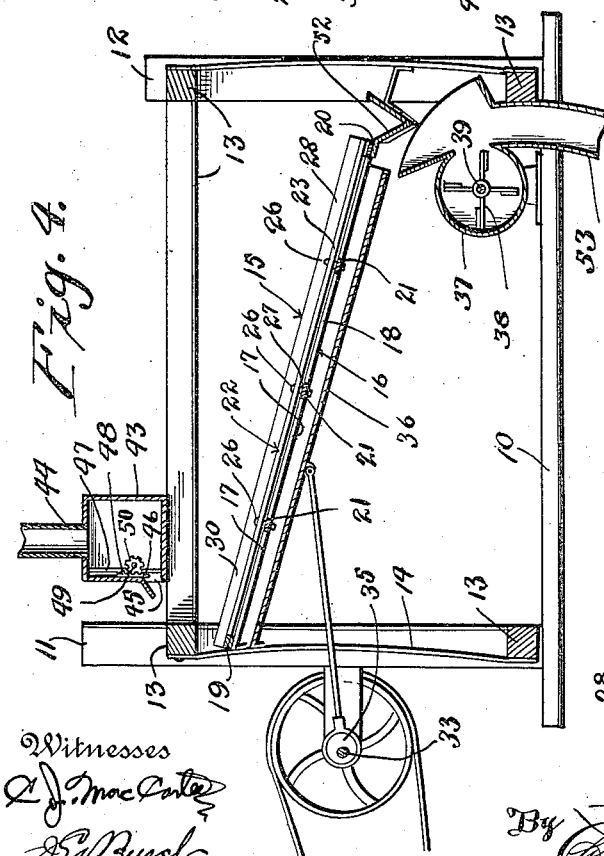
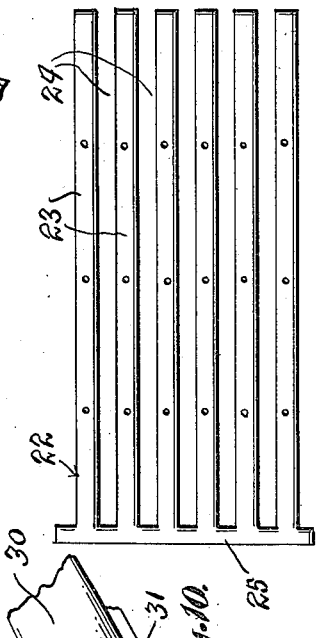

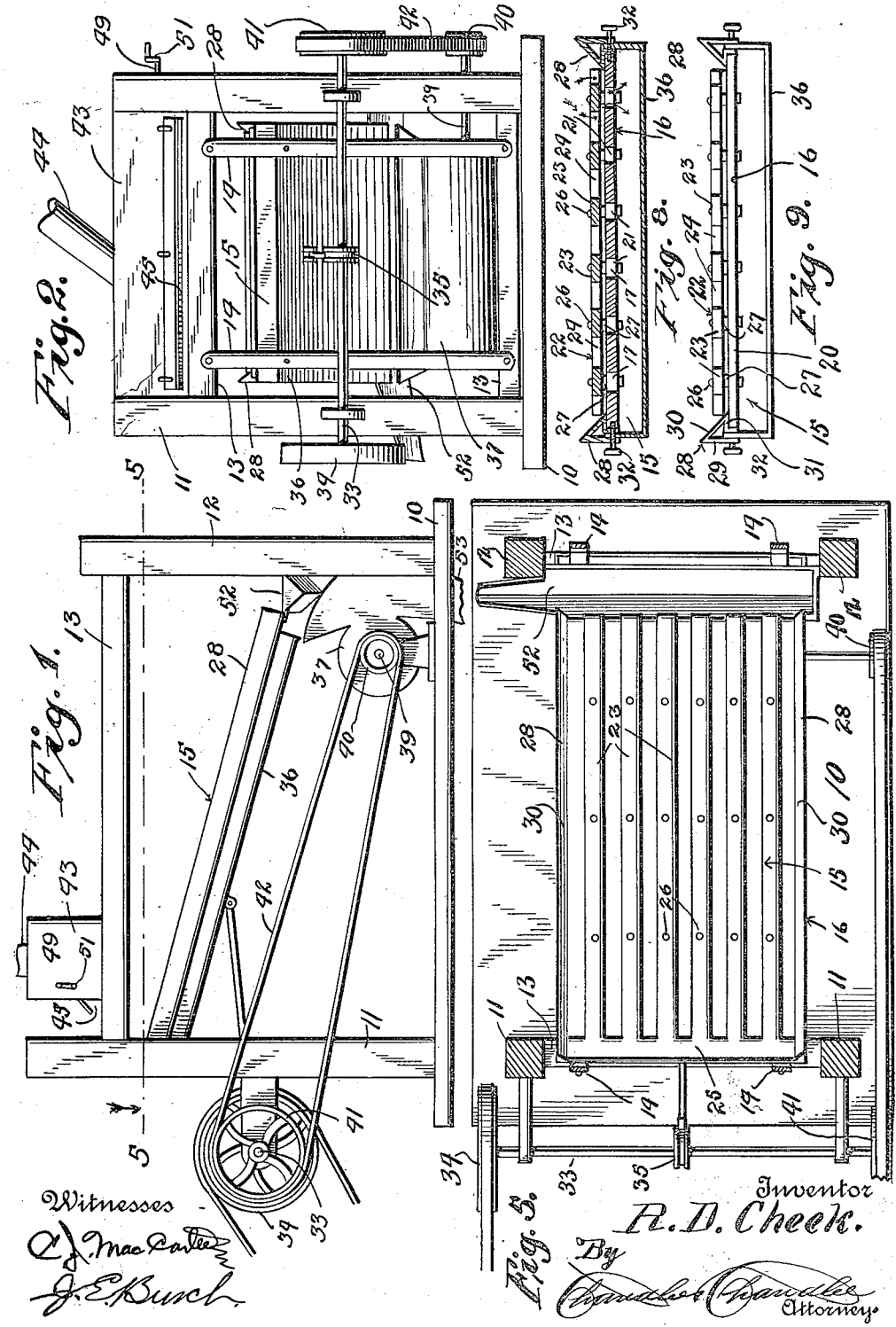

UNITED STATES PATENT OFFICE.

ROY D. CHEEK, OF OLNEY, ILLINOIS.

WHEAT-SEPARATOR.

1,172,110.    Specification of Letters Patent.    Patented Feb. 15, 1916.

Application filed January 11, 1913. Serial No. 741,495.

*To all whom it may concern:*

Be it known that I, ROY D. CHEEK, a citizen of the United States, residing at Olney, in the county of Richland, State of Illinois, have invented certain new and useful Improvements in Wheat-Separators; and I do hereby declare the following to be a full, clear, and exact description of the invention, such as will enable others skilled in the art to which it appertains to make and use the same.

This invention has special reference to novel and useful improvements in separators and more particularly to a wheat separator.

The essential object of the invention is evolved in the provision of a novel separating mechanism by which onion seed and similar seed will be separated from the wheat.

The invention further comprehends an improved separator of the agitating type embodying novel separator sieves so that the wheat or grain is caused to be discharged in a tortuous path between the sieve bars under the agitation instead of depending upon a gravity action, the device being designed for special use after the wheat has been separated once, and the dust, straw and screenings removed, although the device may be used as an original separator and efficiently serve to remove the dust, straw and screenings as well as the onion seed from the wheat at a single operation.

With the above and other objects in view, the invention resides more particularly in the peculiar combinations and arrangements of parts as will be partly illustrated as a preferred embodiment in the accompanying drawings and described in the specification, although the invention is protected for all desirable changes and uses within the scope of the invention as claimed.

Figure 1 is a side elevation of my improved wheat separator. Fig. 2 is an end elevation thereof looking toward the feed end. Fig. 3 is an end elevation thereof looking toward the discharge end. Fig. 4 is a longitudinal sectional view of the device to more particularly disclose the separator mechanism. Fig. 5 is a horizontal sectional view taken on the line 5—5 of Fig. 1. Fig. 6 is a plan view of the bottom sieve plate. Fig. 7 is a similar view of the top sieve plate. Fig. 8 is a cross sectional view of the sieve plates in supported relation and more particularly illustrating the separating action and paths of the materials. Fig. 9 is an end elevation of the sieve plates in operative relation. Fig. 10 is an enlarged detail perspective view showing one of the guard plates for discharging the grain under the sieve bars and preventing displacement thereof at the sides of the sieves.

In illustrating the preferred embodiment of the invention, my improved wheat separator is shown as embodying a base frame 10 having at its corners the posts 11 and 12 respectively, the posts 11 being located at the receiving end and the posts 12 at the discharge end. Braces 13 connect the respective corner posts transversely and longitudinally and serve to support therebeneath through the instrumentality of spring bars 14, consisting of bars of wood or metal of suitable cross section, the sieve structure 15. These spring bars or supports 14 are connected to the cross braces of the frame and the sieve structure or frame 15 is supported in a position inclining from the top of the receiving end toward the bottom of the discharge end and such structure is thereby supported for agitation.

The sieve structure embodies a bottom plate 16 which is preferably made of sheet iron and slotted longitudinally at spaced parallel points as shown at 17 to provide alternate spaces and sieve bars 18, the bars being preferably $\frac{3}{4}$ of an inch wide and the spaces or openings $\frac{3}{4}$ of an inch wide in practice, although such proportions may be varied in accordance with the size of the grain. The ends of the plate 16 are solid or closed as shown at 19 and 20 respectively, thus reinforcing the structure by forming uniting means for the bars and providing receiving and discharging portions for the wheat to be separated and the onions and like particles or materials which will be separately discharged. The bars 18 are further connected by transverse braces 21 in the form of strips produced by integral parts of the plate which may be stamped or cut in the form described. These braces 21 serve to support the top sieve plate 22, the bars 23 of which are arranged in opposite relation to the bars 18 so that the bars 23 will overlie the spaces or openings 17 of the bottom sieve plate and the spaces 24 will overlie portions of the bars 18, the bars 23 and the spaces 24 being preferably $\frac{1}{2}$ of an inch wide to correspond with the aforesaid measurements for this purpose. Thus, the top plate 22 will be provided with as many bars as there are openings in the bottom plate and as many openings within the area of the sieve frame as there are bars in the bottom plate so that the longitudinal edges of the bars 23 will partly overlie the bars 18, thus forming tortuous channels controlling the paths of the separated grain and refuse, including the straw, dust and screenings, while the onions and larger materials are retained between the top bars.

It will also be observed that the top portion of the plate 22 is solid as shown at 25 thus forming a connection between the bars 23, while the openings or spaces 24 communicate with the ends of the bars 23 at the discharge end of the machine. The bars 23 are connected to the cross braces of the plate 16 so as to be spaced above the bars 18, through the medium of the bolts 26 with interposed washers 27 engaged on the bolts, the washers being preferably $\frac{5}{32}$ of an inch thick to properly space the top and bottom bars so that the narrow channels thus provided for the passage of the grain and refuse will be as wide as the difference between the length of a grain and the diameter of such grain, whereby the grain may freely pass through without clogging. Guards 28 are arranged at the sides of the lower sieve plate to discharge the grain on to the sieve and also to prevent displacement of the same at the sides as the structure is agitated in a manner to be hereinafter described. Each guard consists of a sheet metal plate bent to provide a vertical outer portion 29 which at its upper edge is directed or bent downwardly to form an inclined portion or apron 30 which is then bent in an angular direction outwardly and downwardly as shown at 31, the parts being connected by fastening means 32 to the outer bars 17 of the sieve plate so that the top edges of the guards will extend slightly above but substantially in alinement horizontally with the upper faces of the top sieve bars or plate forming the same.

In order to agitate the sieve structure, a shaft 33 is supported at the receiving end of the separator through the instrumentality of the posts 11, such shaft having a drive pulley 34 at one end beyond the frame whereby it may be rotated from any source of power, while an eccentric 35 is fixed to the shaft centrally to engage the receiving end of the sieve frame for agitating the same longitudinally, it being understood that the sieve frame is carried by the spring bars 14 which are bowed and flexible to permit the necessary movement, owing to the fact that their ends are anchored to the cross braces of the frame proper. The sieve pan is indicated by the numeral 36 and is supported within the frame 15 below the sieve structure to receive the grain and refuse, with the exception of onions and like materials or particles, so as to discharge the same in front of the fan casing 37 which is arranged at the lower end of the sieve frame.

A fan 38 is fixed to a shaft 39 carrying at one end a pulley 40 around which and a pulley 41 fixed to the end of the shaft 33 opposite to the pulley 34, is engaged an endless belted drive member 42, thus serving to actuate the fan upon rotation being imparted to the shaft 33. The fastening devices or thumb screws 32 which serve to secure the guard to the bottom sieve plate are also engaged through the sides of the sieve frame 15 at spaced points, thus serving to hold the sieve stationary within the frame but permit convenient removal thereof for any desired purpose. In the practical use of the invention, a feed box 43 is supported by the posts 11 and between the upper ends thereof which are extended above the braces, the wheat being supplied to the feed box through the medium of a spout 44 and discharged through a feed opening 45 onto the sieve. The opening 45 is located longitudinally of the box and the box is provided with a feed regulator which serves to permit the discharge of the proper quantity of wheat or to cut off the supply entirely, such means embodying a plate 46 slidable in guideways 47 carried at the inside of the box near its ends and provided with rack teeth or bars 48 on its inner face near each end. A shaft 49 is rotatably journaled horizontally through the box and carries pinions 50 meshing with the rack teeth or bars 48 whereby rotation of the shaft through the medium of a hand crank 51 at one end of the shaft will permit raising and lowering of the slide.

A trough 52 is fitted to the discharge end of the sieve, being arranged beneath the uppermost sieve plate to discharge the onions and materials traveling therewith at one side of the frame, the trough being extended laterally for this purpose, so that suitable receptacles may be positioned at the discharge end of the trough, which is open, for the collection thereof. By reason of the fact that the space between the upper and lower screen is less than the space between the bars of the upper screen the onion seed, which are of larger diameter than the wheat, will roll down between said bars while the wheat grains will work sidewise between the upper and lower screens. The slots of the lower screen are made wider than the distance between the screens in order that a grain will drop through the lower slot whether presented transversely to the slot or in alinement therewith. Thus as the sieve structure is agitated during a constant and uniform supply of wheat, the grains will be shaken off of the bars 23 and on to the bars 18, so that the grains will pass sidewise through the tortuous channels between the bars of the upper and lower plates and on to the pan 36 whence it will be discharged into the fan casing 37. The blast will then separate the dust, straw and screenings from the grains while the wheat will pass downwardly through a discharge spout 53 by gravity. The onions and larger particles which cannot pass through the channels will be retained on the bars 18 and between the bars 23 which form substantially longitudinal channels so that the material will be conveyed into the trough 52 and afterward discharged at one side of the machine with the waste material. It will thus be evident that I have provided an extremely efficient and simple wheat separator, which by serving to separate the onions and the like from the wheat as well as to remove the straw, dust and screenings, will be instrumental in the production of a much cleaner and better product, desirable alike by farmers and mills.

I claim:

In a wheat separator, the combination with a frame structure and vertically arranged bowed spring bars carried thereby, both ends of each bar being anchored, of a sieve having its ends connected relatively near the upper and lower ends of the bars respectively, and means for agitating the sieve.

In testimony whereof, I affix my signature, in the presence of two witnesses.

ROY D. CHEEK.

Witnesses:
GEORGE O'DONNELL,
EDW. P. RAYBURN.

Copies of this patent may be obtained for five cents each, by addressing the "Commissioner of Patents, Washington, D. C."